United States Patent [19]

Collins, Jr.

[11] Patent Number: 4,693,815
[45] Date of Patent: Sep. 15, 1987

[54] SELF-CLEANING FILTER SYSTEM

[76] Inventor: Henry R. Collins, Jr., 1030 W. Calhoun, Livingston, Tex. 77351

[21] Appl. No.: 891,601

[22] Filed: Aug. 1, 1986

[51] Int. Cl.⁴ ...................... B01D 35/22; B01D 35/26
[52] U.S. Cl. .................................... 210/107; 210/138; 210/414; 210/433.1
[58] Field of Search ............... 210/138, 409, 413, 414, 210/433.1, 106, 107, 407; 73/863.23, 863.81

[56] References Cited

U.S. PATENT DOCUMENTS

| | | | |
|---|---|---|---|
| 3,541,004 | 11/1970 | Cooper, IV et al. | 210/414 |
| 3,598,238 | 8/1971 | Collins, Jr. | 210/138 |
| 4,060,483 | 11/1977 | Barzuza | 210/414 |
| 4,112,768 | 9/1978 | Holland et al. | 210/106 |
| 4,533,471 | 8/1985 | Collins, Jr. | 210/138 |

*Primary Examiner*—Benoit Castel
*Assistant Examiner*—Richard D. Jordan
*Attorney, Agent, or Firm*—Matthews & Associates

[57] ABSTRACT

A self-cleaning filter apparatus including a first filter unit and a second filter unit. Each filter unit includes a housing forming an internal cavity, a liquid agitator means rotatably mounted within the cavity and adapted to be rotated by a rotating means external of the housing. A flat filter element is mounted in supported relation between the housing and a connected housing cap with a filter face openly exposed to said cavity. The housing forms inlet and outlet liquid flow passages for circulating a liquid sample through the cavity around the agitator and into filterable contact with the filter face. The agitator means agitates the liquid sample within the cavity and forces a portion of the liquid sample in a washing action across the filter face. The housing cap forms a liquid filtrate passageway for withdrawing a filtered sample of the liquid sample through filter element. A drive is connected to concurrently drive the agitators of both first filter units. The outlet of the first filter unit is connected to the inlet of the second filter unit to permit liquid sample to be pumped into the inlet of the first filter unit, through the cavity of each said filter unit, and discharged through the outlet of the second filter unit. A hose is respectively connected to each filtrate passageway of the first filter units respectively connected to inlet ports of a three way flow valve. A second conduit is connected to the outlet port of the three way valve. A timer is provided for actuating the three way valve.

8 Claims, 4 Drawing Figures

SELF-CLEANING FILTER SYSTEM

FIELD OF THE INVENTION

This invention generally relates to apparatus for filtering liquid media, and more particularly pertains to automatic self-cleaning filter apparatus.

BACKGROUND OF THE INVENTION

This invention is an improvement to structures such as disclosed in U.S. Pat. Nos. 3,598,238 to Collins, No. 4,533,471 to Collins and U.S. application to Collins, Ser. No. 602,818, filed Apr. 23, 1984, now U.S. Pat No. 4,608,159. The structures shown and described in these patents and application are hereby incorporated by reference.

This invention satisfies a need for automatic self-cleaning filter apparatus which will cyclically clean the filter element of one of two filter units while filtering a filtrate sample through the alternate of the two filter units with the filter apparatus being of relative large capacity and capable of operating for an extended period without need to stop the filtering apparatus for changes in filter elements.

All of the known prior art is cited in the above referenced patents and patent application.

OBJECTS OF THE INVENTION

One object of the present invention is to provide a filtering apparatus which will automatically clean filtered material from first one, then the other, of two filter units while the alternate filter unit is passing a filtrate for subsequent use, to make the provision of sample filtrate substantially continuous with exception of the instants that the filter units are being switched.

Another object of the invention is to provide filter elements of large surface area for extensive usage with low pressure drop and which are readily replaceable.

DESCRIPTION OF A PREFERRED EMBODIMENT

Figure 1:
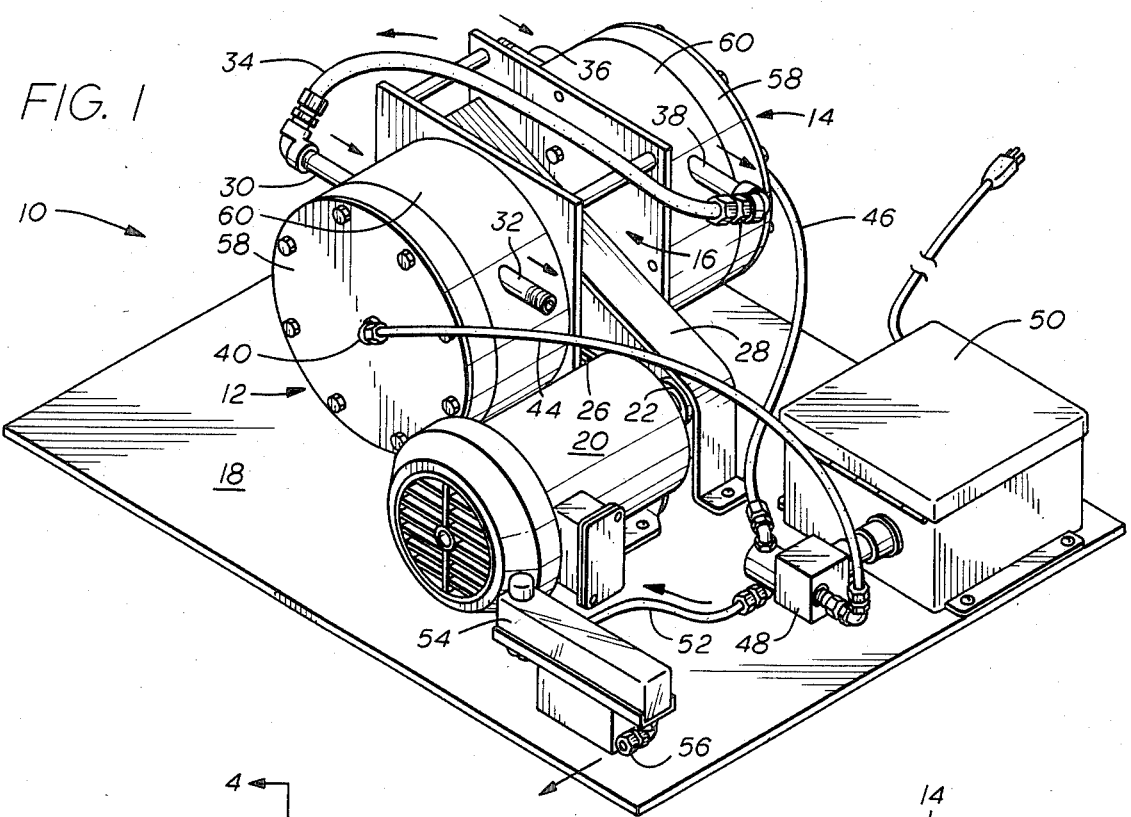
FIG. 1 is a perspective view illustrating the filtering apparatus as a complete unit.

The filter unit 10 is shown in FIG. 1 as including a filter unit 12 and a filter unit 14 connected together and to a base 18 by a connecting frame 16. Also mounted to base 18 is a drive motor 20 having a motor pulley 22 connected through a drive belt 26 to an agitator pulley 24 (best shown in FIG. 2). A belt guard 28 protects persons from the belt 26 as appropriate.

Filter unit 12 is provided with an inlet 30 and an outlet 32 with the inlet 30 connected through a liquid hose 34 to the outlet 38 of filter unit 14. Liquid is supplied through an inlet 36 into filter unit 14 from a liquid source or reservoir by a pump (not shown). Normally, liquid is provided into the filter apparatus 10 which passes into the inlet 36 through the filter unit 14 out of the outlet 38 through the hose 34 into the inlet 30 through the filter unit 12 and out of outlet 32 to a drain or back to the source, as desired.

Figure 2:
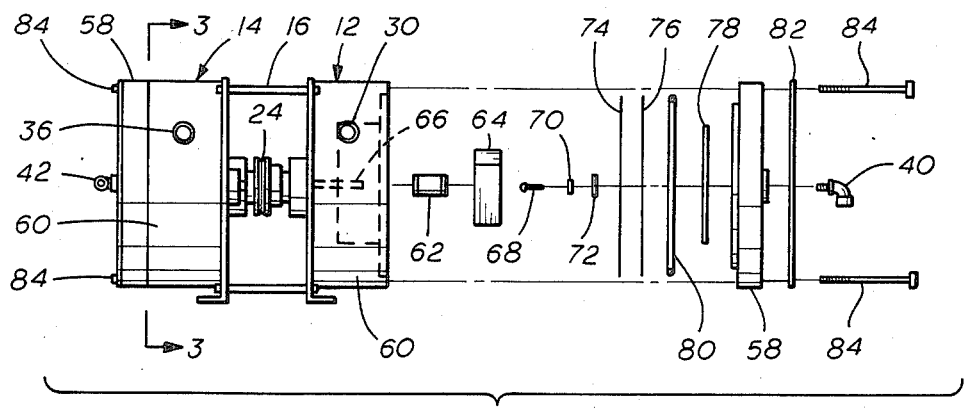
FIG. 2 is an elevational view showing the two filtering units of FIG. 1 with one of these units being shown as an "exploded" view showing its component parts.

The filter unit 12 is provided with a filtrate sample outlet 40 and filter unit 14 is equipped with a filtrate sample outlet 42, best shown in FIGS. 1 and 2. Sample outlet 40 is connected through a sample hose 44 into a three way solenoid valve 48. Sample outlet 42 is connected through a sample hose 46 into the three way solenoid valve 48 as shown. The outlet of valve 48 is connected through a sample hose 52 into an adjustable flow controller/indicator 54 as shown. Device 54 may be a Rotameter (R), if desired. Indicator 54 is provided with an outlet 56 for connection into a sample analyzer or the like.

Referring now to FIG. 2, there is shown the filter unit 12 and the filter 14 as connected by the connecting frames 16. At the right of FIG. 2, the filter unit 12 is shown as an exploded view with its component parts extending to the right. The filter unit 14 is constructed identically so like parts bear like numbers for the sake of simplicity and clarity.

Filter unit 12 is seen to include a cap 58 connected onto a body 60 by means of a plurality of retainer bolts 84. Alternately, the retainer bolts 84 could be provided as threaded studs (not shown) with threaded wing nuts as threaded connectors.

Figure 3:
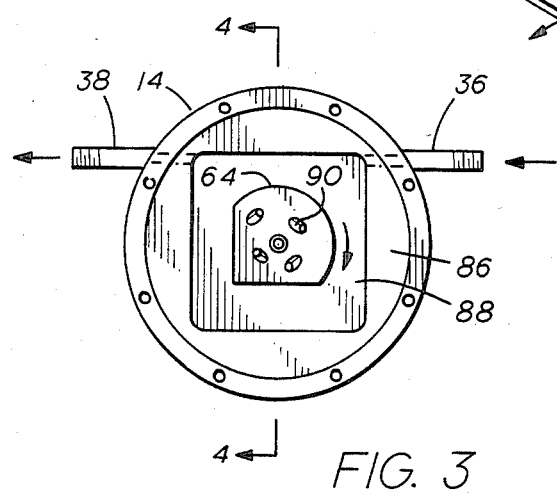
FIG. 3 is a cross-sectional view taken at line 3—3 of FIG. 2.

The filter unit 12 is seen to include a rotatable shaft 66 rotated by the pulley 24 and extending through a shaft seal unit 62 to be connected to a rotary agitator 64, best shown in FIG. 3.

The filter assembly starts with the cap 58 to which is attached a filter support plate 78, a felt filter pad 76 and a filter element 74 which is connected by means of a filter retainer screw 68, a metal retainer washer 70 and a plastic retainer washer 72. The washer 72 bears directly against the exposed surface of the filter element 74.

Figure 4:
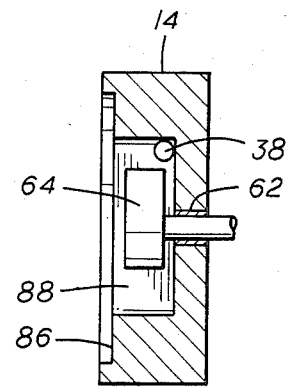
FIG. 4 is a cross-sectional view taken at line 4—4 of FIG. 3.

Taking now FIG. 2 with FIG. 4, the filter assembly as described is fitted into a O-ring filter recess 86 which is formed around a square agitator cavity 88. The arrangement is such that the filter element 74 and felt filter pad 76 fit into the filter recess 86 and are held in place by an O-ring 80 which forms the seal between cap 58 and body 60 such that an open face of filter 74 is exposed to liquid within the agitator cavity 88, shown in FIGS. 3 and 4.

As seen in FIG. 3, the agitator 64 is provided with a plurality of wash holes 90 which are formed through the agitator 64 on successively different radii. The holes 90 are also formed at an incline with respect to their radius of rotation such that rotation will tend to cause each hole 90 to function as a pump due to the rotation of the agitator.

In the embodiment shown in FIGS. 3 and 4, the inclined holes 90 are such that rotation of the agitator 64 will pick up liquid from the side of the agitator next to the seal 62 and force the liquid against and across the open face of the filter element 74 at all times that the agitator 64 is being rotated. It is also to be noted that the rotation of the agitator 64 is opposite the direction of flow into inlet 36.

The exterior profile of the agitator 64 is seen to be partly circular and partly angular. The reason for this that the agitator 64 is designed to cause random turbulence and agitation of the liquid within the cavity 88 and thereby aid in the washing action against the face of the filter element 74 while an external pump (not shown) actually forces the liquid in and out of the cavity 88.

As seen in FIG. 1, the sample hoses 44 and 46 are respectively connected through the sample outlets 40 and 42 to each provide a filtrate sample to the solenoid valve 48.

The valve 48 alternately closes off flow through the sample hose 44 and the sample hose 46 when cyclically energized and deenergized by the electrical timer and switch 50. The sample filtrate sample coming through either hose 44 or hose 46 is passed through the sample hose 52 into the adjustable flow controller indicator 54 and on to a sample analyzer or the like as do the prior art devices.

The switching transit time of the solenoid valve 48 is very short, a few milliseconds for example, so that the flow through the sample hose 52 is relatively constant though alternately coming through the sample hose 44 and the sample hose 46.

OPERATION OF THE PREFERRED EMBODIMENT

In operation, a liquid is supplied through filter 12 and filter 14 from an external pump (not shown) with the drive motor 20 and the timer 50 both being in operation. The rotary agitators 64 maintain the liquid within the cavities 88 of the filter units 12 and 14 in a state of great turbulence. Concurrently, each agitator 64 draws such turbulent liquid through the agitator wash holes 90 to be discharged in a swirling, washing action against the exposed face of a respective filter element 74.

At the time that liquid is flowing through a filter unit and its associated sample hose, sample hose 44 for example, such flow creates a pressure differential across the filter 74 which tends to retain filtered particles on the face of the filter. Even with the swirling, washing action of the turbulent liquid coming through the wash holes 90, some of the filtered out particles remain and begin to accumulate on the face of the filter 74.

When the solenoid valve 48 switches the liquid flow through the hose 44 to flow through the hose 46, then the pressure differential on its associated filter element 74 begins with consequent particle accumulation on the open face of that filter. Meanwhile, the pressure differential across the filter associated with hose 44 has ceased to exist and the swirling, washing action of the turbulent liquid through the hose 90 in that filter unit effectively removes all of the filtered out particles which has accumulated on that associated filter face.

The timer 50 switches the solenoid valve 48 in a regular cycle to cause a repeated cycle of flow through hose 44, then hose 46. The cycle frequency produced by the timer 50 may be adjustable. As an example, the timer 50 may be adjusted to cause the solenoid valve 48 to cycle at thirty second intervals and thereby permit flow alternately through hose 44 or hose 46 for thirty second periods with the filter element 74 associated with the closed off hose being washed clean of filtered particulates in the meantime.

The filter apparatus illustrated in FIG. 1, is specifically identified as a Model 8500 sample conditioning system, as an example. This model is designed, for example, to supply a 35–50 ml filtered sample to on-stream process analyzers. Membrane filter elements 74 are used to remove submicron and larger particles from the analyzer samples. Standard filter elements have a 0.2 micron rating. The filter elements may be supplied with other micron ratings.

As previously described, the filter units 12 and 14 house the membrane filter element 74. A by-pass flow of two to six gpm updates the sample and provides part of the cleaning action of each filter element. Such by-pass flow is the flow entering the inlet 36 from an external pump and exiting through the outlet 32, as previously described. Such by-pass flow alone does not provide much turbulence in this model to keep the filter element clean. Accordingly, the rotary agitator 64 with its wash holes 90 is operated in each of filter units 12 and 14 through the belt drive system driven by the motor 20. The two rotary agitators 64 are driven by a ¼ hp motor, for example.

The membrane filter elements 74 are thin (0.005 inches thick) sheets of polymer material that have a closely controlled porosity. The thin filter element gives a surface type filtering action. Particles larger than the pore size remains on the filtered surface. With the standard 0.2 micron filter elements, particles larger than 0.2 micron will not enter the filter element pores. Particles on the surface of the filter element are cyclically washed off and carried out in the 2–6 gpm by-pass stream.

The model 8500 filtering system uses 7 inch diameter filter elements, for example. A small hole is located in the center of the filter element 74 to permit assembly and attachment of the filter element 74, the filter pad 76, and the support plate 78 to the cap 58 by the retainer screws 68 and associated retainer washers 70 and 72, as previously mentioned.

The filter elements 74 do not require replacement until the flow has reached a minimum, or a break through in the filter element occurs. Such a break through or rupture in a filter element 74 is indicated when there is a drastic increase in flow and/or when particles appear in the filtrate to the analyzer.

A back pressure on the model 8500 can be maintained by putting a long length (15 to 20 feet) of ⅜" or ¼" diameter tubing, as appropriate, on the by-pass flow out of the outlet 32. This use of tubing eliminates plugging problems associated with valves which are sometimes used to maintain a back pressure. A pressure gage (not shown) is useful on the input or output of the filtering system to observe the by-pass condition.

It is to be noted that, while a preferred embodiment of the filtering system 10 is disclosed, considerable change and modification may be made to the filter system and its component parts, all while remaining in the spirit of the invention as reflected by the purview and scope of the appended claims.

What is claimed:

1. A self-cleaning filter combination, comprising:
   (a) a housing having an internal cavity;
   (b) a liquid agitator means rotatably mounted within said cavity and adapted to be rotated by a rotating means external of said housing;
   (c) a flat filter means mounted in supported relation between said housing and a connected housing cap with a filter face openly exposed to said cavity;
   (d) said housing having inlet and outlet liquid flow passages for circulating a liquid sample through said cavity around said agitator and into filterable contact with said filter face;
   (e) said agitator means having means to agitate said liquid sample within said cavity and to pump a portion of said liquid sample in a flow washing action against and across said filter face said agitator means comprises an agitator rotor having an irregular circumferential surface for agitating said liquid sample and also having a plurality of passageways inclined with respect to the axis of said rotor and disposed different radial distances away form said axis to cause a pumping action responsive to rotation of said rotor, said pumping action liquid sample in a flow washing action against and across said filter face; and (f) said housing cap having a liquid filtrate passageway for withdrawing a filtered sample of said liquid sample through said filter means.

2. The combination of claim 1 wherein said flat filter means comprises a flat filter element providing said filter face and backed by a porous flat filter pad and a support plate.

3. A self-cleaning filter apparatus comprising:
(a) a first filter unit and a second filter unit of the same combination as specified in claim 1;
(b) rotating means connected to concurrently drive the agitator means of said first filter unit and said second filter unit;
(c) conduit means connecting the outlet of said first filter unit to the inlet of said second filter unit whereby a liquid sample may be pumped into the inlet of said first filter unit, through the cavity of each said filter unit, and discharged through the outlet of said second filter unit;
(d) a hose respectively connected to each filtrate passageway of said first filter unit and said second filter unit and respectively connected to inlet ports of a three way flow valve;
(e) a second conduit connected to the outlet port of said three way valve; and
(f) timer means for actuating said three way valve between its first position and its second position and thereby to alternately withdraw filtered liquid sample from said first filter unit and said second filter unit and thereby to cause the filter face of each said filter unit to be alternately washed clean of filtered particles while the other filter face is receiving liquid sample to be passed to said three way valve.

4. The filter apparatus of claim 3 wherein the filter element of each said filter unit has 0.2 micron openings.

5. A self-cleaning filter apparatus including:
(1.) a first filter unit, and
(2.) a second filter unit with each said filter unit comprising:
(a) a housing having an internal cavity;
(b) a liquid agitator means rotatably mounted within said cavity and adapted to be rotated by a rotating means external of said housing;
(c) a flat filter means mounted in supported relation between said housing and a connected housing cap with a filter face openly exposed to said cavity;
(d) said housing having inlet and outlet liquid flow passages for circulating a liquid sample through said cavity around said agitator and into filterable contact with said filter face;
(e) said agitator means having means to agitate said liquid sample within said cavity and to force a portion of said liquid sample in a washing action across said filter face; and
(f) said housing cap having a liquid filtrate passageway for withdrawing a filtered sample of said liquid sample through said filter means.

(3.) rotating means connected to concurrently drive the agitator means of said first filter unit and said second filter unit;

(4.) conduit means connecting the outlet of said first filter unit to the inlet of said second filter unit whereby a liquid sample may be pumped into the inlet of said first filter unit, through the cavity of each said filter unit, and discharged through the outlet of said second filter unit;

(5.) a hose respectively connected to each filtrate passageway of said first filter unit and said second filter unit and respectively connected to inlet ports of a three way flow valve;

(6.) a second conduit connected to the outlet port of said three way valve; and (7.) timer means for actuating said three way valve between its first position and its second position and thereby to alternately withdraw filtered liquid sample from said first filter unit and said second filter unit and thereby also to cause one filter face of each said filter unit to be alternately washed clean of filtered particles while the other filter face is receiving liquid sample to be passed to said three way valve.

6. The apparatus of claim 5 wherein said flat filter means comprises a flat filter element providing said filter face and backed by a porous flat filter pad and a support plate.

7. The apparatus of claim 5 wherein said agitator means comprises an agitator rotor having an irregular circumferential surface for agitating said liquid sample and also having a plurality of passageways inclined with respect to the axis of said rotor and disposed different radial distances away from said axis to cause a pumping action responsive to rotation of said rotor, said pumping action thereby forcing said portion of said liquid sample in a washing action across said filter face as specified.

8. The apparatus of claim 7 wherein the filter element of each said filter unit has 0.2 micron openings.

* * * * *